No. 831,308. PATENTED SEPT. 18, 1906.
T. D. STAGG.
WHEEL FOR VEHICLES.
APPLICATION FILED OCT. 28, 1905.

4 SHEETS—SHEET 1.

Witnesses.
Robt. A. Cruel
L. B. Middlet.

Inventor.
Thomas D. Stagg
by Herbert W. T. Jenner.
Attorney.

No. 831,308. PATENTED SEPT. 18, 1906.
T. D. STAGG.
WHEEL FOR VEHICLES.
APPLICATION FILED OCT. 28, 1905.

4 SHEETS—SHEET 2.

Witnesses.
Robt. A. Cissel
L. B. Middleton

Inventor.
Thomas D. Stagg
by Herbert W. Jenner.
Attorney.

No. 831,308. PATENTED SEPT. 18, 1906.
T. D. STAGG.
WHEEL FOR VEHICLES.
APPLICATION FILED OCT. 28, 1905.
4 SHEETS—SHEET 3.
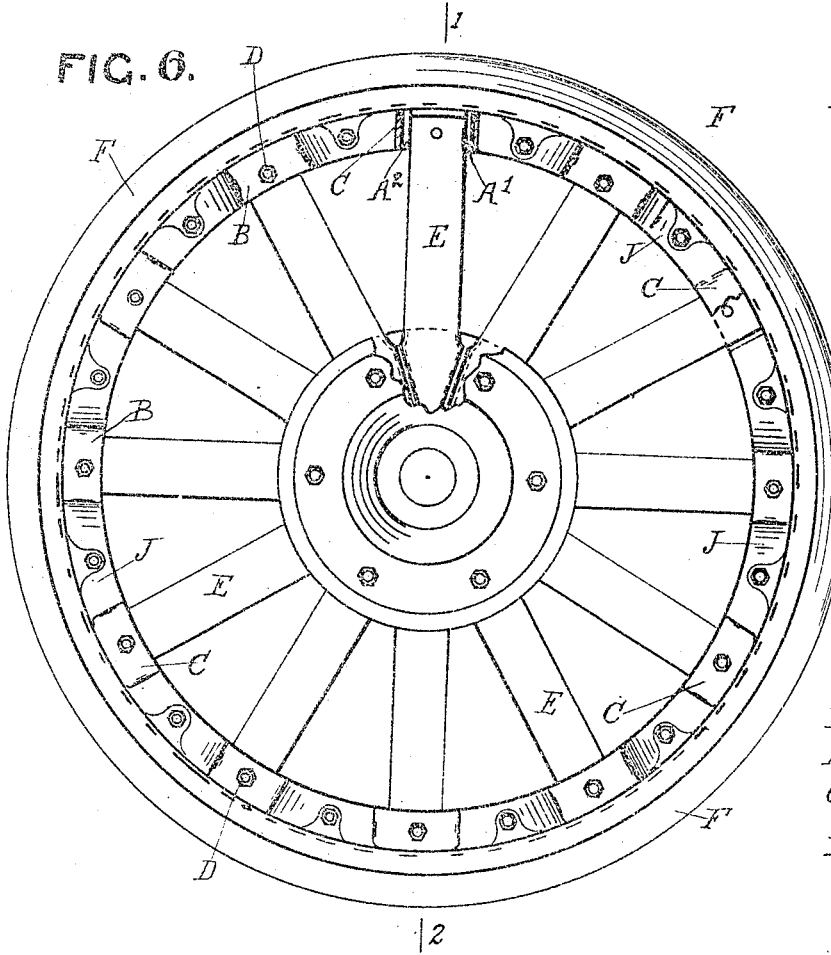
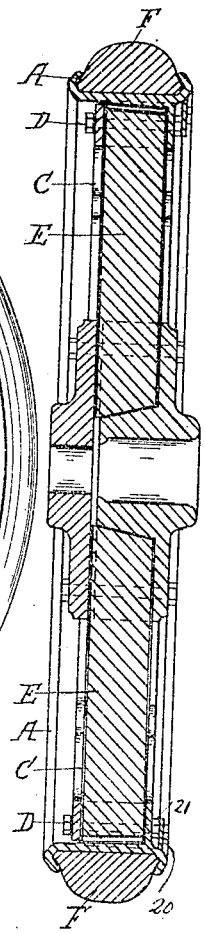
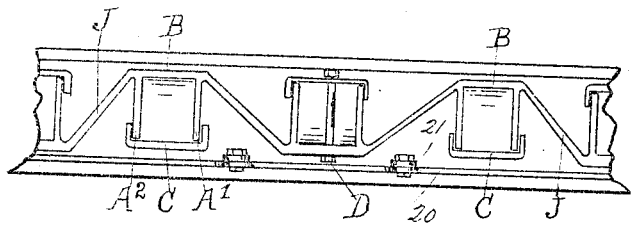
Witnesses.
Inventor.
Thomas D. Stagg
by Herbert W. Jenner
Attorney.

No. 831,308. PATENTED SEPT. 18, 1906.
T. D. STAGG.
WHEEL FOR VEHICLES.
APPLICATION FILED OCT. 23, 1905.

4 SHEETS—SHEET 4.

Witnesses.
Robt. A. Cissel
L. B. Middleton.

Inventor.
Thomas D. Stagg
by Herbert W. Jenner.
Attorney

UNITED STATES PATENT OFFICE.

THOMAS DANIEL STAGG, OF SELBY, ENGLAND.

WHEEL FOR VEHICLES.

No. 831,308.  Specification of Letters Patent.  Patented Sept. 18, 1906.

Application filed October 28, 1905. Serial No. 284,851.

*To all whom it may concern:*

Be it known that I, THOMAS DANIEL STAGG, managing director, a subject of the King of Great Britain, residing at Selby, in the county of York, England, have invented certain new and useful Improvements in or Relating to Wheels for Vehicles; and I do hereby declare the following to be a full, clear, and exact description of the invention, such as will enable others skilled in the art to which it appertains to make and use the same.

This invention relates to wheels for motor-vans, motor-wagons, motor-cars, and vehicles of every description, driving-pulleys, and the like, and has for its object an improved construction of felly or rim whereby the spokes can be held more securely in position, and if any should break or become damaged, new ones can be readily substituted for them, and, further, the felly may be run either with or without a separate tire, as desired, the construction being such that whether the wheel is provided with a separate tire or not there is no working loose of the spokes as a result of the "hammering," which the wheel is subjected to by traveling over rough ground and the consequent increase in the size of the tire as a result of this what may be termed "beating-out" process, as is the case with existing wheels.

In order that my invention may be clearly understood and readily carried into effect, I will describe the same with reference to the accompanying drawings, in which like letters of reference indicate like parts where they occur, and wherein—

Figure 1:
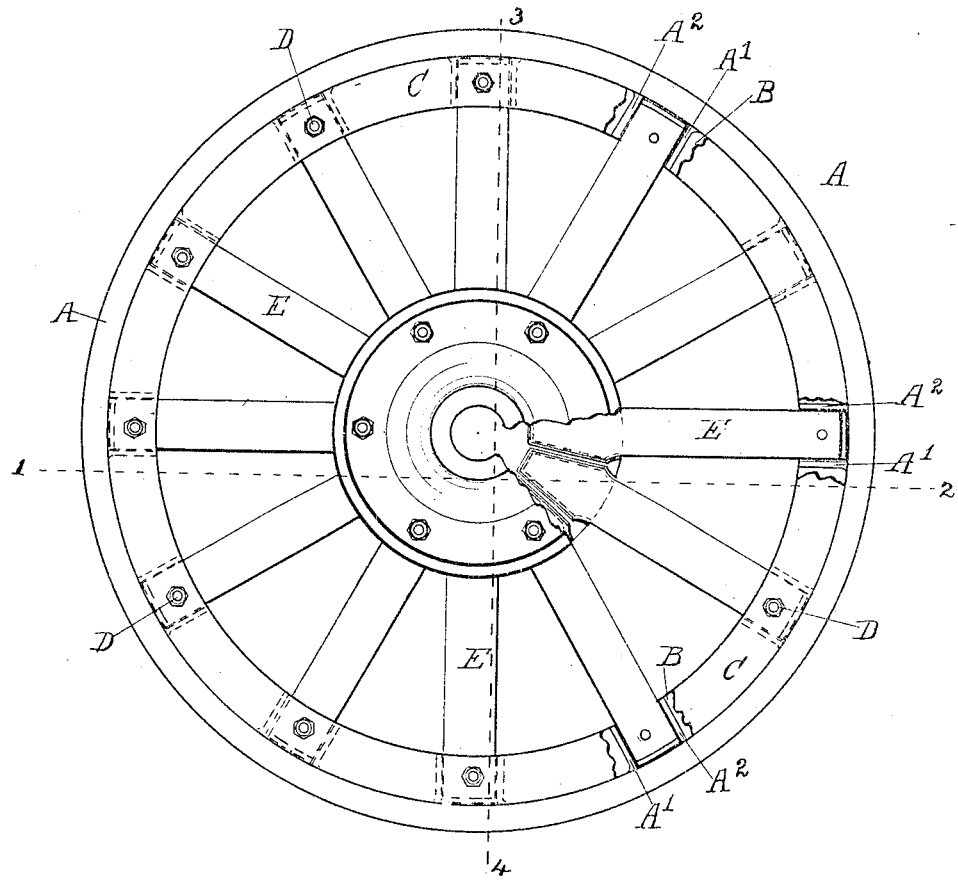
Figure 2:
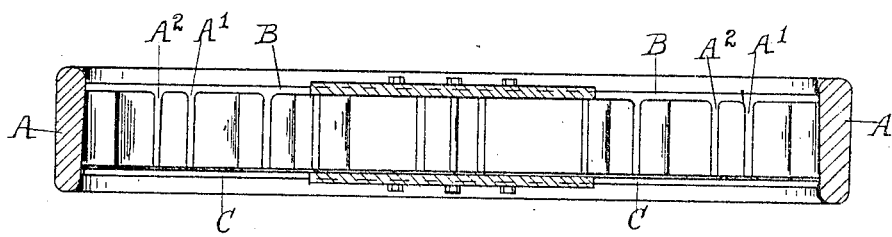
Figure 3:
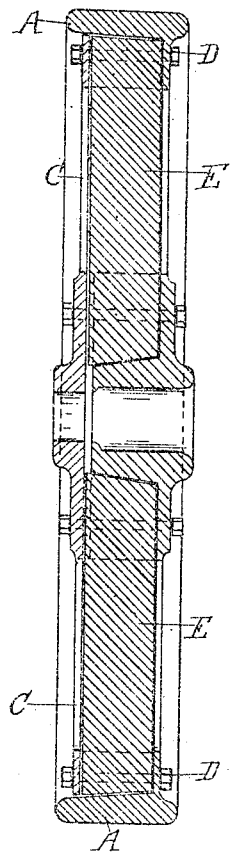
Figure 5:
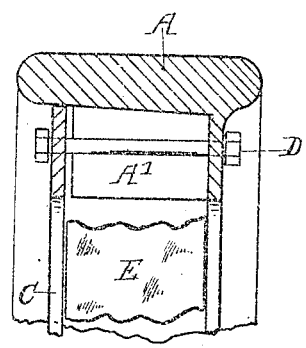
Figure 4:
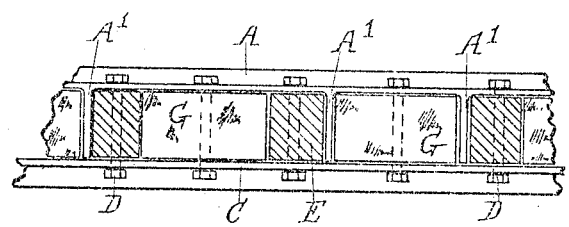
Figure 9:
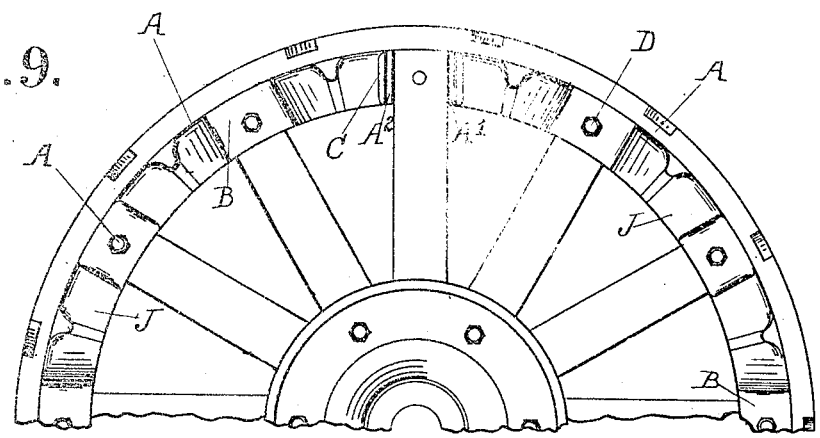
Figure 10:
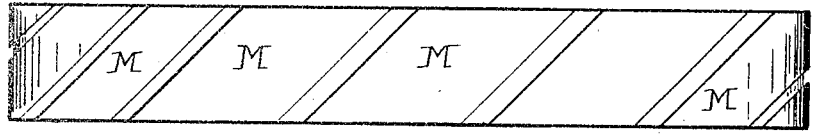
Figure 11:
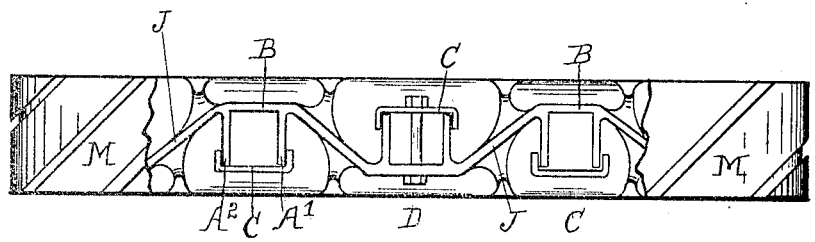

Figure 1 shows in side elevation a wheel provided with my improved felly or rim. Fig. 2 is a sectional view on the line 1 2 of Fig. 1. Fig. 3 is a sectional view on the line 3 4 of Fig. 1. Fig. 4 is an under side view of a part of my improved felly and shows a means of utilizing filling-pieces for forming the side walls of the pockets and giving the wheel the appearance of a wood-fellied wheel. Fig. 5 is an enlarged sectional view of part of the rim or felly and the detachable side plate or ring. Fig. 6 shows a modified form of rim in which alternate pockets are at opposite sides and in which separate pockets covering-plates are employed in place of a continuous ring. Fig. 7 is a sectional view on the line 1 2 of Fig. 6. Fig. 8 is an under side view of part of a rim, showing the complete pockets and the covering-plates. Fig. 9 shows in side view part of a wheel with a rim similar to that illustrated at Figs. 6, 7, and 8, but having its outer surface or tread in the form of strakes M. Fig. 10 is a plan view of same. Fig. 11 is a similar view, but with part of the rim broken away to allow of the pockets being seen.

In carrying my invention into effect I make the felly of the wheel in the form of an annealed or other steel or suitable metal ring A, either formed by casting, forging, stamping or other suitable means, said ring A being of any suitable section and being either in one piece or built up of sections and being provided on its under side or inner face with a series of projecting walls $A'$ $A^2$ and with a projecting flange or rib B (which latter may be continuous or not, as desired) at one side, the projecting walls and the flange or rib constituting the two sides and back, respectively, of a series of pockets, the projecting walls $A'$ and $A^2$ forming the sides and the flange the back of the said pockets, the front of each pocket being open, a detachable ring C either complete or in sections being employed for completing the pockets, said ring being secured in position by bolts D or other suitable means when the spokes are fitted in the wheel, said bolts passing through the loose ring C, through the spoke E, and through the flange or rib B, which forms the back of the pockets, so securing not only the detachable ring, but the spokes in position.

I preferably make the pockets tapered internally from front to back by increasing the thickness of the side walls and the base of the pockets in a backward direction and the side walls from top to bottom also, this gradual increase in thickness of the side walls and the base of the pockets reducing the area of the pockets at the base and at the back, the spoke ends being so shaped as to wedge therein and being sufficiently wide as to project slightly beyond the front of the pockets. By this means any shrinkage of the spokes which would cause a slackness in the ordinary construction of wheel can be taken up and renewed rigidity be imparted to the wheel.

The pocket-ring may be provided with a circumferential channel running around it, if desired, as shown at Figs. 6, 13, and 15 in cross-section, to receive a rubber or other suitable tire F or a felly or both a tire and a felly.

The spaces between the pockets may be filled up by means of filling-pieces G, of wood or any suitable material or substance, which not only give a finish to the rim, but prevent water, dirt, or the like from lodging in such spaces, and, if desired, such filling-pieces may constitute the sides of the pockets and the side walls be dispensed with, and at Fig. 4 I have illustrated a means of employing filling-pieces for that purpose; but I have shown the pocket-ring with a series of projecting parts or walls A', each of which forms one side wall of a pocket, one side of a spoke end bearing against the side wall when such spoke is placed in position, the filling-piece G, fitting tightly between the side of the end of the spoke and the side of the end of the next spoke, acting as a chock or wedge between the ends of the two spokes, so dispensing with one of the walls of each pocket, a filling-piece fitting between the ends of each two spokes throughout the entire ring, the loose ring C completing the pockets, the filling-pieces being bolted to the said loose ring and the flange or rib of the pocket-ring, as are also the spoke ends; but it will be obvious that this arrangement may be modified—as, for instance, what I call the "pocket-ring" may simply be provided with the continuous flange or rib B without any side walls, as before mentioned, the spoke ends fitting between the ends of the filling pieces or chocks, the pockets thus being formed by the flange or rib B of the ring A forming the back of the pockets, the loose ring C the front, and the filling-pieces G the sides of the pockets.

In the modified form of rim or felly illustrated at Figs. 6, 7, 8, 9, 10, and 11 of the accompanying drawings the front or open part of each alternate pocket faces in one direction and the front or open part of each intermediate pocket in the opposite direction—that is, one series of pockets is formed on one side of the flange of the pocket-ring and the other series of pockets on the other side of such flange. A diagonal or other rib J runs from pocket to pocket around the whole inner circumference of the pocket-ring for strengthening purposes. With this construction of ring each alternate spoke is put in at the opposite side, and in place of employing a loose ring for completing the pockets by covering up the fronts or open parts I employ loose caps C, preferably a separate one for each pocket, the caps and spokes being bolted to the flange or rib B, forming the back of the pockets, as before described.

If desired, the connecting-ribs and the loose caps may be employed when the pockets all face in one direction.

Having thus described my invention, what I claim as new, and desire to secure by Letters Patent, is—

1. In a wheel, the combination, with a metallic rim provided with an internally-projecting circumferential flange and an inclined seat for the end of a spoke, of a spoke provided with a beveled end which abuts against the said seat, means for preventing the said spoke from slipping sidewise on the said seat, a cover bearing against the front of the said spoke, and a bolt passing through holes in the said cover, spoke and flange and forcing the beveled end of the spoke against the said seat.

2. In a wheel, the combination, with a metallic rim provided with an internally-projecting circumferential flange and a series of spoke-sockets the backs of which are formed by the said flange, the fronts of the said pockets being open and part of them facing to one side of the wheel and the remainder to the other side, and all the said pockets having inclined seats for the ends of the spokes, a series of spokes having beveled ends which abut against the said seats and fit in the said pockets, covers bearing against the fronts of the said spokes, and bolts passing through holes in the said covers, spokes and flange and forcing the beveled ends of the spokes against the said seats.

In testimony whereof I affix my signature in the presence of two witnesses.

THOMAS DANIEL STAGG.

Witnesses:
 EDUARD BILTON,
 GEO. P. MARKHAM.